(12) United States Patent
Maxwell

(10) Patent No.: US 6,470,181 B1
(45) Date of Patent: Oct. 22, 2002

(54) METHOD AND APPARATUS FOR SIMULTANEOUS TEXT AND AUDIO FOR SPONSORED CALLS

(75) Inventor: Stewart Hodde Maxwell, Dallas, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/196,727

(22) Filed: Nov. 20, 1998

(51) Int. Cl.[7] .............................................. H04M 11/10
(52) U.S. Cl. ........................ 455/413; 455/456; 455/466; 455/558; 379/67.1; 379/80; 379/88.12
(58) Field of Search ................................. 455/422, 456, 455/466, 517, 3.01, 3.03, 566, 412, 413–414, 556, 557, 558, 461; 379/67.1, 80, 88.12

(56) References Cited

U.S. PATENT DOCUMENTS

| | | | | |
|---|---|---|---|---|
| 6,031,467 A | * | 2/2000 | Hymel et al. ................ | 455/414 |
| 6,085,099 A | * | 7/2000 | Ritter et al. ................. | 455/466 |
| 6,112,084 A | * | 8/2000 | Sicher et al. ............... | 455/426 |
| 6,175,743 B1 | * | 1/2001 | Alperovich et al. ......... | 455/466 |
| 6,181,927 B1 | * | 1/2001 | Welling, Jr. et al. ........ | 455/414 |
| 6,212,551 B1 | * | 4/2001 | Asghar et al. .............. | 709/206 |

FOREIGN PATENT DOCUMENTS

WO  WO-90/01843  *  2/1990  .......... H04M/11/00

* cited by examiner

Primary Examiner—Simon Nguyen
(74) Attorney, Agent, or Firm—John D. Crane; Bracewell & Patterson, L.L.P.

(57) ABSTRACT

A combination of Global System for Mobile communications (GSM) capabilities including Short Message Service (SMS), Subscriber Identity Module (SIM) and Customized Applications for Mobile network Enhanced Logic (CAMEL) allows an advertiser to pay a portion of the airtime cost of a call originated by a mobile subscriber after that subscriber has listened to a recorded advertisement. The combination delivers a text message that associates with a recorded audio advertisement. The text message, which may be referred to later, is stored by the subscriber's handset and may be a transcript of the audio advertisement, provide additional details of the audio advertisement or it may contain an electronic coupon associated with the advertisement.

36 Claims, 3 Drawing Sheets

METHOD AND APPARATUS FOR SIMULTANEOUS TEXT AND AUDIO FOR SPONSORED CALLS

BACKGROUND OF THE INVENTION

1. Technical Field

The present invention relates in general to text messaging via mobile telephone communications and in particular to text messaging utilizing Subscriber Identity Module, Global System for Mobile communications and Short Message Service. More particularly, the present invention relates to associating specific recorded text messages with selected recorded audio transmissions to a selected mobile unit (handset) within a mobile telephone communications system.

2. Description of the Related Art

Global System for Mobile Communications ("GSM") was originally designed as a digital cellular network standard to unify many incompatible analog systems in use in Europe. GSM standards are a subset of Integrated Services Data Network ("ISDN") which support speech, data and Group 3 facsimile standard. The standard provides for cell broadcast, where messages may be broadcast to subscribers in specific cells within the network and Short Message Service ("ISMS") which allows subscribers to send and receive alphanumeric messages.

GSM architecture may be divided into three parts: a Mobile Station, a Base Station Subsystem ("BSS") and a Network Switching Subsystem ("NSS"). Mobile station is the mobile unit or handset utilized by the subscriber to make wireless calls and contains a removable Subscriber Identity Module ("SIM"), a "smart card" (a small self-contained computer with its own CPU and memory) containing all data and pertinent information concerning the subscriber.

BSS comprises a Base Transceiver Station (BTS) and a Base Station Controller ("BSC"). BTS helps define a cell and handles radio interface protocols with a mobile station. BSC manages interface channels as well as handovers (maintaining contact with network as a subscriber travels from cell to cell within the network). BSS interfaces with a Network Subsystem comprising a Mobile Switching Center ("MSC"), Equipment Identity register ("EIR"), Home Location Register ("HLR"), Visitor Location Register ("VLR") and Authentication Center ("AC").

The Network Switching Subsystem (NSS) is anchored by the MSC. The MSC acts like a switching node of the Public Switched Telephone Network ("PSTN") or ISDN and functions to handle a subscriber by authentication, location updating, MSC handovers and call routing. The MSC, along with multiple intelligent databases, forms the network subsystem and provides connection with public networks.

Intelligent databases, contained within the NSS, are stored in registers and contain information regarding various aspects of the relation of the subscriber and the cellular network. One such database, the Home Location Register ("HLR"), contains administrative information, including identity and location of the subscriber's handset within the network. Another database, Visitor Location Register ("VLR"), contains information concerning a mobile unit detected in a cell that is home registered in another HLR. Information is retrieved from the SIM in the visitor's mobile unit and the subscriber's profile is downloaded to the VLR from the subscriber's home location HLR and retained during the time the visitor remains in the MSC's area. Also contained within the NSS is a database—Equipment Identity Register—containing a list of all valid mobile handsets on the network and a database—Authentication Center containing a secret key in each subscriber's SIM, used for authentication and encrypting on the radio channel.

Communication with the databases and BSS, MSC and Short Message Service Center ("SMSC") are supported by a protocol described by GSM specifications—Mobility Application Part ("MAP"). SMSC is the GSM network node responsible for routing short messages that may utilize a protocol, Short Message Peer-to-Peer ("SMPP"), through the SMSC to subscribers.

Intelligent Networking ("IN") provides service applications for wireless communications. IN is an architecture for telephony networks that employs a Service Control Point ("SCP") and Intelligent Peripherals ("IP") to control handling of calls at a telephony switch. An IP provides voice resources to a SCP and aids in executing subscriber services by playing announcements to a subscriber and collecting digits entered from a subscriber's handset. SCP executes subscriber services that can control certain functions of the MSC, IP and SMSC.

Among the various service applications available is a service that enables a business user to play a promotional announcement as a subscriber initiates a call. The business user provides an option for the subscriber to listen to the announcement and receive a portion of the initiated call for free, because the business user sponsors a portion of the call. The listener has the option of listening, aborting or by-passing the announcement by pressing a designated key. A term for this service is "Sponsored Call." Sponsored Call is a service supported by Customized Applications for Mobile network Enhanced Logic ("CAMEL"). CAMEL, covered in GSM standard 09.78 (version 5.3.0, 1998-01) enhances GSM to provide Intelligent Network services.

IN expands service options of cellular communication and Sponsored Call is a potentially profitable option. A sponsored call may be a personal call, to any party, by the subscriber, unrelated to an advertisement. However, the advertisement is an audio message and if the subscriber wants to take advantage of the product or service offered by the advertising sponsor, the subscriber must remember the specifics of the offer during the sponsored phone call which follows the advertisement. A long phone call by the subscriber would increase the probability that the subscriber would forget important details of the advertisement.

It would be desirable therefore, to provide a method and apparatus for text messaging, utilizing Subscriber Identity Module, Global System for Mobile communications and Short Message Service that would enhance and supplement recorded audio transmissions. It would further be desirable to provide specific recorded text messages to associate with selected recorded audio transmissions to a selected mobile unit (handset) within a mobile telephone communications system to insure the subscriber retains details of an audio transmission.

SUMMARY OF THE INVENTION

It is therefore one object of the present invention to provide a method and apparatus for sending and receiving text messages within a cellular communications network utilizing Subscriber Identity Module, Global System for Mobile communications and Short Message Service to enhance and supplement audio transmissions.

It is another object of the present invention to provide a method and apparatus for associating a text message with an audio message.

It is yet another object of the present invention to provide a method and apparatus for delivering an audio message and an associated text message simultaneously to a subscriber's handset.

The foregoing objects are achieved as is now described. A combination of Global System for Mobile communications (GSM) capabilities including Short Message Service (SMS), Subscriber Identity Module (SIM) and Customized Applications for Mobile network Enhanced Logic (CAMEL) allows an advertiser to pay a portion of the airtime cost of a call originated by a mobile subscriber after that subscriber has listened to a recorded advertisement. The combination delivers a text message that associates with a recorded audio advertisement. The text message, which may be referred to later, is stored by the subscriber's handset and may be a transcript of the audio advertisement, provide additional details of the audio advertisement or it may contain an electronic coupon associated with the advertisement.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
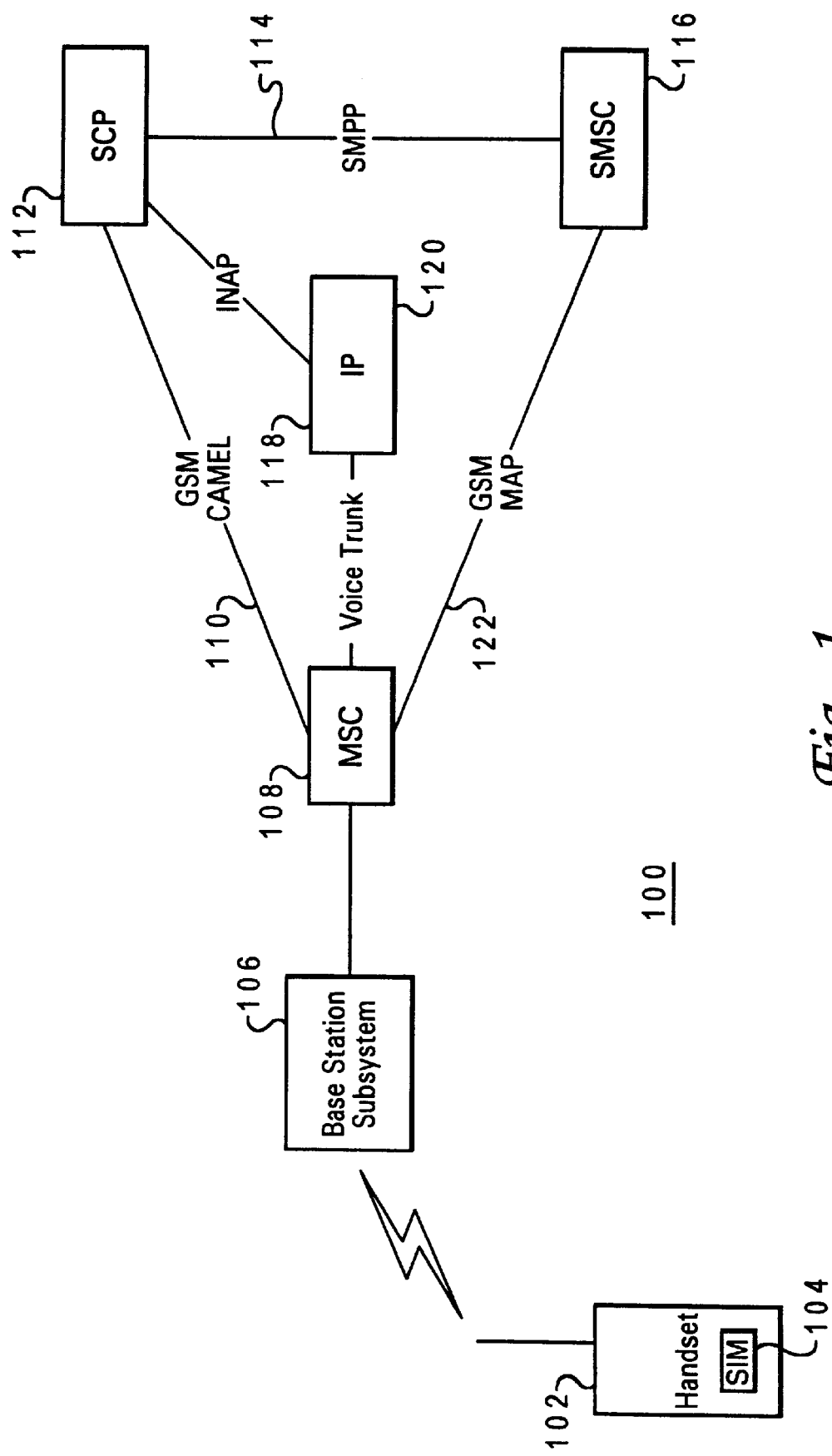
FIG. 1 depicts a high-level diagram of network connections in a communications system in which a preferred embodiment of the preferred invention may be implemented.

With reference now to the figures, and in particular with reference to FIG. 1, a high-level diagram of network connections in a communications system, in which a preferred embodiment of the preferred invention may be implemented, is depicted. Network 100 is a cellular network operating as described by GSM specifications. Connections and signalling between each element within the network are governed and described by GSM specifications. Subscriber Identity Module ("SIM") 104 is a "smart card" device which is a self-contained computer with its own CPU and memory. It plugs into the mobile unit ("handset") 102 and identifies a mobile subscriber to the GSM network. SIM 104 is compliant with "Specification of the SIM Application Toolkit for the Subscriber Identity Module-Mobile Equipment (SIM-ME) Interface," GSM standard 11.14 (version 7.0.0, release 1998), and has the capability to store and execute applications that interact with the handset 102. Base Station 106 receives and transmits text and audio to handset 102.

Mobile Switching Center 108 is similar to a traffic cop directing incoming and outgoing transmissions to Base Station 106. As the subscriber moves into a new location area (a specified group of cells within the network that have a common location address within the network), handset 102 retrieves subscriber information from SIM 102 and automatically transmits through MSC 108 to Service Control Point 112. If the subscriber moves from one cell to another within the same location area, handset 102 does not send a location update message. Handset 102 only sends a location update to MSC 108 when the subscriber moves from a cell in one location area to a cell in a different location area.

SCP 112 executes service logic for subscriber services that may control certain functions of MSC 108, Intelligent Peripheral (IP) 120, and Short Message Service Center (SMSC) 116. SCP 112 is connected to SMCS 116 through a protocol such as those described in "Interface Protocols for the connection of Short Message Service Centers to Short Message Entities," GSM 03.39 (version 5.0.0, November 1996). IP 120 is a well known Intelligent Network concept. It provides interactive voice resources to SCP 112 and aids SCP 112 in executing subscriber services by playing announcements to a subscriber and collecting numbers entered from a subscriber's handset. SCP 112 controls IP 120 using a protocol such as Intelligent Network Application Part ("INAP"). IP 120 is connected to MSC 108 by a standard telephony voice trunk.

As a subscriber moves into a new location area, handset 102 sends a location update message to MSC 108. GSM CAMEL Intelligent Network (IN) trigger processing logic in MSC 108 sends notification of a location update to SCP 112. Location update notification triggers sponsored call service logic at SCP 112 to send a short message, utilizing GSM Short Message Service, to subscriber's handset 102. SCP 112 must send a message to SMSC 116 requesting SMSC 116 go send the short message. The short message contains: a special character string indicating the short message is to be processed by a SIM 104 application; advertisement text; a correlation identifier corresponding to an audio advertisement stored in IP 120 and an expiration date and time. The short message is received and processed by the Sponsored Call Application in SIM 104. It is stored as a normally received short message that may be displayed at a later time.

The message is not visible to the subscriber and the subscriber is unaware of the short message reception. Several short messages may be sent to the subscriber's handset and stored in SIM 104. As the subscriber makes a call, additional digits are attached to the original dialed number that include the sponsored call code and a correlation identifier. The code initiates the sponsored call feature and the identifier causes the IP to play an audio advertisement associated with the stored short message identifier.

Figure 1A:
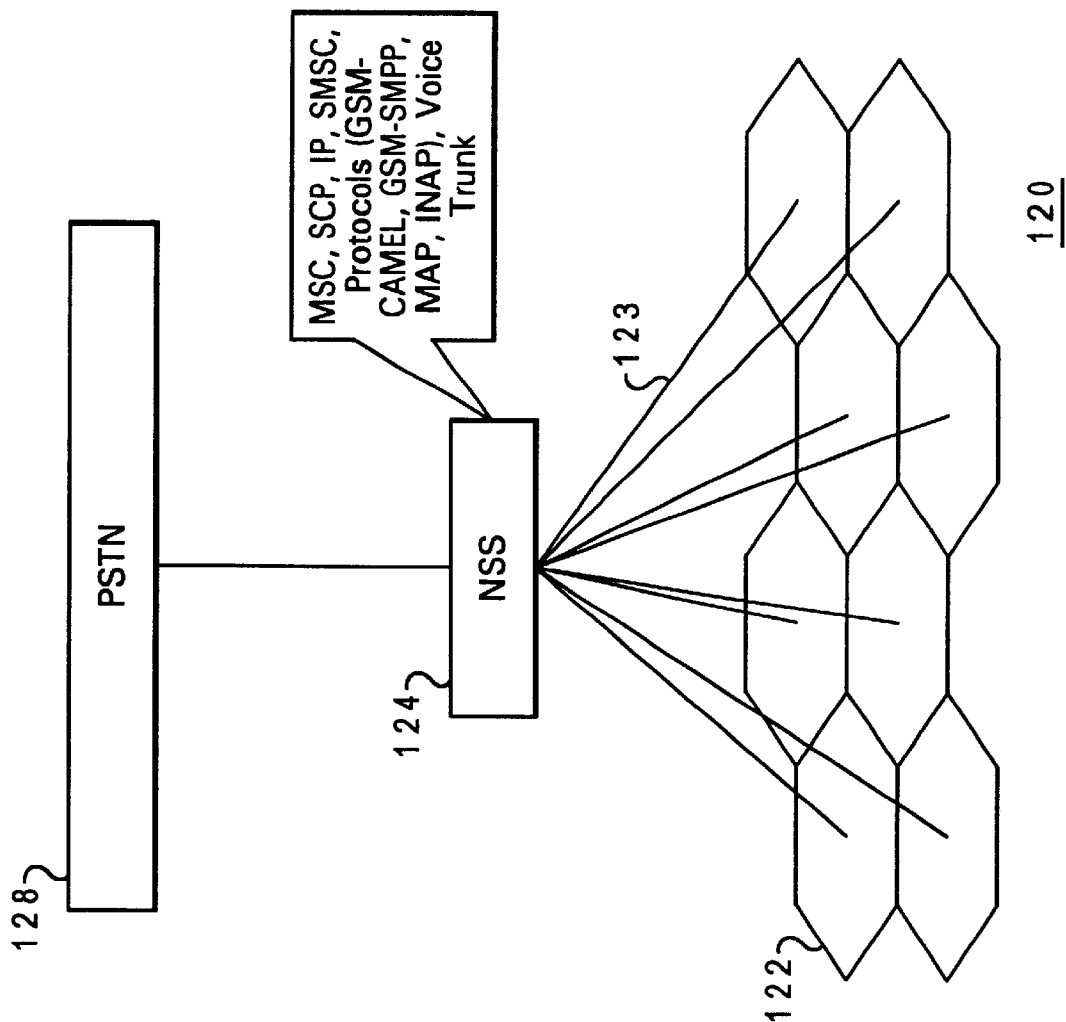
FIG. 1A illustrates a high-level block diagram of a portion of a cellular network in which a preferred embodiment of the present invention may be implemented.

Referring to FIG. 1A, a high-level block diagram of a portion of a cellular network in which a preferred embodiment of the present invention may be implemented, is illustrated. Cellular network 120 includes electronically defined land areas for handling cellular transmissions to and from a larger wireless/cellular telephony network. Cell 122 is supported by a Base Station Subsystem (not shown) that connects with Network Switching Subsystem (NSS) 124. NSS 124 utilizes various components and protocols including MSC, SCP, IP, etc., to provide communication services between mobile units or between mobile units and Public Switched Telecommunication Network (PSTN) 128 (regular wire and cable telephone service).

Figure 2:
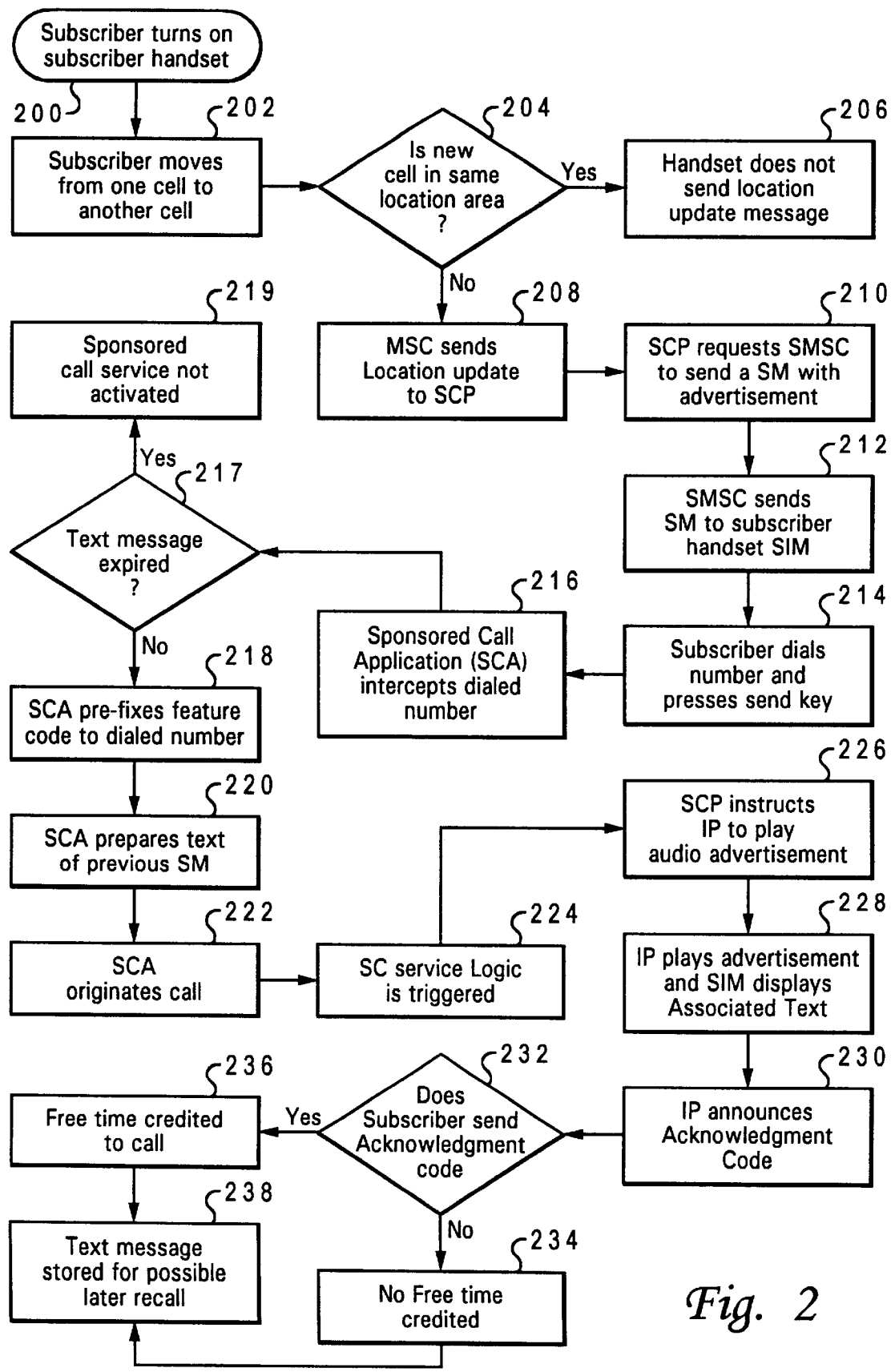
FIG. 2 is a high level flow chart of the process for delivering a text message to a mobile phone display, simultaneously with an audio message in accordance with a preferred embodiment of the present invention.

Referring now to FIG. 2, a high level flow chart of the process for delivering a text message, to a mobile phone display, simultaneously with an audio message in accordance with a preferred embodiment of the present invention, is illustrated. The process begins with step 200, which illustrates a subscriber to a mobile telephone service turning on the subscriber's handset. The process proceeds to step 202, which illustrates the subscriber moving from one cell to another within the mobile telephone service area. The process next proceeds to step 204, which depicts a determination of whether or not the handset has moved into a cell within the same location area. If the handset has moved into a new cell in the same location area, the process passes to step 206, which illustrates handset not sending a location update message to the service provider's mobile switching center (MSC).

If the handset has moved into a new cell that is located in a new location area, the process then proceeds to step 208, which depicts the MSC sending a location update to the Service Control Point (SCP). Other methods to signal the SCP to transmit sponsored call short messages may be to automatically send messages to target subscribers based on time of day or subscriber information provided when signing up or a subscriber dialing a sponsored call code (subscriber intentionally invokes service to receive an advertisement to receive free call time). The process then proceeds to step 210, which illustrates the SCP requesting the Short Message Service Center to send a short message to the subscriber's handset. The short message is sent to the handset if the handset is powered on. If the handset is not powered on, the SM is stored at the HLR of the subscriber. After the handset powers up the short message is sent to the subscriber's handset.

Transmitting this short message (step 212) may be triggered by any of several methods including a GSM CAMEL intelligent Network Location Update Trigger. The short message contains: a special character string indicating the short message is to be processed by a SIM application; advertisement text; a correlation identifier corresponding to an audio advertisement stored in the intelligent peripheral (IP) and a message expiration time and date. The short message is received by the subscriber's handset and is processed by the Sponsored Call Application ("SCA") in the Subscriber Identity Module (SIM) within the subscriber's handset. The short message is not visible to the subscriber and the subscriber is not aware of its reception. Several messages may be stored in the SIM.

After the short message has been stored in the SIM, the process then passes to step 214, which depicts the subscriber dialing a number and pressing the send key on the handset. The process next passes to step 216, which illustrates the SCA logic, in the SIM, intercepting the digits that were entered when the subscriber pressed the send key. The process continues to step 217, which depicts the SIM determining if the stored text message has expired. As discussed previously, the SIM receives the message from the SMSC with an expiration period attached. The SIM checks the message expiration and if the message date and time has expired, the process proceeds to step 219, which illustrates the SIM allowing the call to originate from the handset without attaching a sponsored call feature code. This will prevent the Sponsored Call Service from being activated. If the text message date and time has not expired, the process instead passes to step 218, which depicts the SCA logic attaching a sponsored call feature code (for activating a CAMEL supported Detection Point at the MSC) to the dialed number and the call is originated. The process then passes to step 220, which illustrates the SCA preparing to display text of the previously received short message on the handset display.

The process next proceeds to step 222, which depicts the sponsored call application originating the call after attaching the advertisement correlation code to the dialed number. The process then continues to step 224 which illustrates a Detection Point 3 (CAMEL supported sponsored call feature) trigger being sent to the SCP to initialize Sponsored Call service logic. The process passes to step 226, which depicts the SCP instructing the Intelligent Peripheral (IP) to play an audio advertisement associated with the text message currently displayed on the subscriber's handset. Next, the process proceeds to step 228, which illustrates the IP transmitting the audio message to the handset and the SIM simultaneously displaying the text message previously received. For example, the audio message may be an advertisement by a restaurant near or within the subscriber's location area—"Have plans for lunch? Come to Pizza House today and get a large pepperoni for $2.00. Press 7 to receive 5 minutes on this call." At the same time a text message could be displayed on the terminal display of the hand set—"Today's lunch special is a large pepperoni pizza for $2 at Pizza House 222 E. Main st. 555-2222. " The SIM displays the stored text advertisement, corresponding to the audio message transmitted to the handset.

The process then passes to step 230, which depicts the IP transmitting a randomly generated acknowledgement code announcement at the end of the advertisement. The code must be entered to confirm the subscriber has listened to the audio advertisement. Otherwise, the subscriber will receive no free call time. After the text message is displayed by the handset, the process continues to step 232, which illustrates the IP, having transmitted the advertisement, detecting whether or not the subscriber has sent the acknowledgment code. If the wrong code is transmitted or no code is transmitted, the process then passes to step 234, which depicts the no free time being credited to the call in progress. The process then continues to step 238, which illustrates the SIM storing the text message for possible later retrieval by the subscriber.

If the subscriber does send the proper acknowledgment code, the process instead proceeds to step 236, which depicts a specified amount of time being credited to the subscriber's call. The process next proceeds to step 238 and the text message is stored for possible recall.

The present invention delivers a text message that accompanies a pre-recorded advertisement transmitted to a subscriber's handset. A portion of a wireless call made by a subscriber may be paid for by an advertiser whose audio message is transmitted to the subscriber's handset. The invention associates and displays a text message with the audio advertisement. The text message may be a transcript of the audio advertisement, it may include additional details or it may contain an electronic coupon associated with the audio advertisement. The text message may be referred to later, by the subscriber, as the text message is stored in the handset.

Existing standard GSM capabilities are enhanced by coordinating SIM-based applications, GSM CAMEL intelligent network capabilities and Short Message Service to simultaneously provide a text message and an associated prerecorded audio message to a subscriber. This improves the existing Sponsored Call service by making the service more appealing and easier to use.

While the invention has been particularly shown and described with reference to a preferred embodiment, it will be understood by those skilled in the art that various changes in form and detail may be made therein without departing from the spirit and scope of the invention.

What is claimed is:

1. A method for use within a cellular telephony network for associating a text message with an audio message that is transmitted to a mobile unit, comprising the steps of:
   receiving a location update message from said mobile unit at a mobile switching center;
   responsive to said receiving a location update message, sending a text message to said mobile unit, wherein said text message includes a correlation identifier corresponding to an audio message, said sending a text message to said mobile unit including:
      notifying a Service Control Point of a location update from said mobile unit;
      triggering call service logic within said Service Control Point to send said text message; and
      sending said text message to a Subscriber Identity Module in said mobile unit, wherein said Subscriber Identity Module includes functions for:
         intercepting a dialed number;
         attaching a sponsored call feature code prefix to an original dialed number, wherein said prefix includes said correlation identifier;
         uploading said dialed number to said mobile unit;
         receiving a text message; and
         displaying said text message on a display screen of said mobile unit;
   receiving a call request from said mobile unit; and
   responsive to said receiving a call request from said mobile unit, transmitting said audio message to said mobile unit wherein said text message is delivered to said mobile unit prior to or during transmission of said audio message.

2. The method of claim 1, wherein said transmitting said audio message to said mobile unit further comprises:
   triggering Sponsored Call logic at a Service Control Point;
   instructing an Intelligent Peripheral to play an audio message associated with said text message; and
   sending a message acknowledgment code to said mobile unit for subscriber entry.

3. The method of claim 1, further comprising:
   within said mobile unit:
      retrieving said text message from a Subscriber Identity Module memory; and
      displaying said text message on a mobile unit display screen.

4. The method of claim 1, wherein said mobile unit receives said text message prior to reception of said audio message or during reception of said audio message, said method further comprising transmitting said text message to said mobile unit in a same data stream with said audio message.

5. The method of claim 1, wherein said mobile unit receives said text message prior to reception of said audio message or during reception of said audio message, said method further comprising transmitting said text message to said mobile unit in a parallel data stream concurrently with said audio message.

6. The method of claim 1, further comprising storing said text message in said Subscriber Identity Module.

7. The method of claim 1, wherein said text message is a short text message, said method further comprising displaying said short text message simultaneously with playing said audio message.

8. The method of claim 7, wherein said displaying said short text message simultaneously with playing said audio message further comprises:
   triggering Service Control Point Sponsored Call logic to instruct an Intelligent Peripheral to transmit an audio message to said mobile unit that correlates to a previously received text message;
   displaying said text message while playing said audio message; and
   transmitting an acknowledgment code that said subscriber must send at the end of said audio message to acknowledge receipt of said audio message.

9. An apparatus for use within a cellular telephony network for associating a text message with an audio message that is transmitted to a mobile unit, comprising:
   means for receiving a location update message from said mobile unit at a mobile switching center;
   means responsive to receiving a location update message, for sending a text message to said mobile unit, wherein said text message includes a correlation identifier corresponding to an audio message, said means for sending a text message to said mobile unit including:
      means for notifying a Service Control Point of a location update message from said mobile unit;
      means for triggering call service logic within said Service Control Point to send said text message; and
      means for sending said text message to a Subscriber Identity Module in said mobile
   means for receiving a call request from said mobile unit, wherein said Subscriber Identity Module includes:
      means for intercepting a dialed number;
      means for attaching a sponsored call feature code prefix to an original dialed number, wherein said prefix includes said correlation identifier;
      means for uploading said dialed number to said mobile unit;
      means for receiving a text message; and
      means for displaying said text message on a display screen of said mobile unit; and
   means responsive to receiving a call request from said mobile unit, for transmitting said audio message to said mobile unit wherein said text message is delivered to said mobile unit prior to or during transmission of said audio message.

10. The apparatus of claim 9, wherein said means for transmitting said audio message to said mobile unit further comprises:
    means for triggering Sponsored Call logic at a Service Control Point;
    means for instructing in Intelligent Peripheral to play an audio message associated with said text message; and
    means for sending a message acknowledgment code to said mobile unit for subscriber entry.

11. The apparatus of claim 9, wherein said mobile unit comprises:
    means for retrieving said text message from a Subscriber Identity Module memory; and
    a mobile unit display screen for displaying said text message.

12. The apparatus of claim 9, wherein said mobile unit receives said text message prior to reception of said audio message or during reception of said audio message, said apparatus further comprising means for transmitting said text message to said mobile unit in a same data stream with said audio message.

13. The apparatus of claim 9, wherein said mobile unit receives said text message prior to reception of said audio message or during reception of said audio message, said apparatus further comprising means for transmitting said text message to said mobile unit in a parallel data stream concurrently with said audio message.

14. The apparatus of claim 9, further comprising means for storing said text message in said Subscriber Identity Module.

15. The apparatus of claim 9, wherein said text message is a short text message, said apparatus further comprising means for displaying said short text message simultaneously with playing said audio message.

16. The apparatus of claim 15, wherein said means for displaying said short text message simultaneously with playing said audio message further comprises:
   means for triggering Service Control Point Sponsored Call logic to transmit an audio message to said mobile unit that correlates to a previously received text message;
   means for displaying said text message while playing said audio message; and
   means for transmitting an acknowledgment code that said subscriber must send at the end of said audio message to acknowledge receipt of said audio message.

17. A method for use within a cellular telephony network for associating a text message with an audio message that is transmitted to a mobile unit, comprising the steps of:
   receiving a location update message from said mobile unit at a mobile switching center;
   responsive to said receiving a location update message, sending a text message to said mobile unit, wherein said text message includes a correlation identifier corresponding to an audio message;
   receiving a call request from said mobile unit; and
   responsive to said receiving a call request from said mobile unit, transmitting said audio message to said mobile unit wherein said text message is delivered to said mobile unit prior to or during transmission of said audio message.

18. The method of claim 17, wherein the step of sending a text message to said mobile unit further comprises:
   notifying a Service Control Point of a location update from said mobile unit;
   triggering call service logic within said Service Control Point to send said text message; and
   sending said text message to a Subscriber Identity Module in said mobile unit.

19. The method of claim 18, further comprising storing said text message in said Subscriber Identity Module.

20. The method of claim 18, wherein said Subscriber Identity Module includes functions for:
   intercepting a dialed number;
   attaching a sponsored call feature code prefix to an original dialed number, wherein said prefix includes said correlation identifier;
   uploading said dialed number to said mobile unit;
   receiving a text message; and
   displaying said text message on a display screen of said mobile unit.

21. The method of claim 1, wherein said text message is a short text message, said method further comprising displaying said short text message simultaneously with playing said audio message.

22. The method of claim 21, wherein said displaying said short text message simultaneously with playing said audio message further comprises:
   triggering Service Control Point Sponsored Call logic to instruct an Intelligent Peripheral to transmit an audio message to said mobile unit that correlates to a previously received text message;
   displaying said text message while playing said audio message; and
   transmitting an acknowledgment code that said subscriber must send at the end of said audio message to acknowledge receipt of said audio message.

23. The method of claim 17, wherein said transmitting said audio message to said mobile unit further comprises:
   triggering Sponsored Call logic at a Service Control Point;
   instructing an Intelligent Peripheral to play an audio message associated with said text message; and
   sending a message acknowledgment code to said mobile unit for subscriber entry.

24. The method of claim 17, further comprising:
   within said mobile unit:
      retrieving said text message from a Subscriber Identity Module memory; and
      displaying said text message on a mobile unit display screen.

25. The method of claim 17, wherein said mobile unit receives said text message prior to reception of said audio message or during reception of said audio message, said method further comprising transmitting said text message to said mobile unit in a same data stream with said audio message.

26. The method of claim 17, wherein said mobile unit receives said text message prior to reception of said audio message or during reception of said audio message, said method further comprising transmitting said text message to said mobile unit in a parallel data stream concurrently with said audio message.

27. An apparatus for use within a cellular telephony network for associating a text message with an audio message that is transmitted to a mobile unit, comprising:
   means for receiving a location update message from said mobile unit at a mobile switching center;
   means responsive to receiving a location update message, for sending a text message to said mobile unit, wherein said text message includes a correlation identifier corresponding to an audio message;
   means for receiving a call request from said mobile unit; and
   means responsive to receiving a call request from said mobile unit, for transmitting said audio message to said mobile unit wherein said text message is delivered to said mobile unit prior to or during transmission of said audio message.

28. The apparatus of claim 27, wherein said means for sending a text message to said mobile unit, further comprises:
   means for notifying a Service Control Point of a location update message from said mobile unit;
   means for triggering call service logic within said Service Control Point to send said text message; and
   means for sending said text message to a Subscriber Identity Module in said mobile unit.

29. The apparatus of claim 28, further comprising means for storing said text message in said Subscriber Identity Module.

30. The apparatus of claim 28, wherein said Subscriber Identity Module includes:

means for intercepting a dialed number;

means for attaching a sponsored call feature code prefix to an original dialed number, wherein said prefix includes said correlation identifier;

means for uploading said dialed number to said mobile unit;

means for receiving a text message; and means for displaying said text message on a display screen of said mobile unit.

31. The apparatus of claim 27, wherein said text message is a short text message, said apparatus further comprising means for displaying said short text message simultaneously with playing said audio message.

32. The apparatus of claim 31, wherein said means for displaying said short text message simultaneously with playing said audio message further comprises:

means for triggering Service Control Point Sponsored Call logic to transmit an audio message to said mobile unit that correlates to a previously received text message;

means for displaying said text message while playing said audio message; and means for transmitting an acknowledgment code that said subscriber must send at the end of said audio message to acknowledge receipt of said audio message.

33. The apparatus of claim 27, wherein said means for transmitting said audio message to said mobile unit further comprises:

means for triggering Sponsored Call logic at a Service Control Point;

means for instructing in Intelligent Peripheral to play an audio message associated with said text message; and means for sending a message acknowledgment code to said mobile unit for subscriber entry.

34. The apparatus of claim 27, wherein said mobile unit comprises:

means for retrieving said text message from a Subscriber Identity Module memory; and a mobile unit display screen for displaying said text message.

35. The apparatus of claim 27, wherein said mobile unit receives said text message prior to reception of said audio message or during reception of said audio message, said apparatus further comprising means for transmitting said text message to said mobile unit in a same data stream with said audio message.

36. The apparatus of claim 27, wherein said mobile unit receives said text message prior to reception of said audio message or during reception of said audio message, said apparatus further comprising means for transmitting said text message to said mobile unit in a parallel data stream concurrently with said audio message.

* * * * *